US007430170B2

(12) United States Patent
Mahamuni et al.

(10) Patent No.: US 7,430,170 B2
(45) Date of Patent: Sep. 30, 2008

(54) SYSTEM AND METHOD FOR IMPLEMENTING PROTOCOL STACK ACROSS MULTIPLE CHASSIS

(75) Inventors: Atul B. Mahamuni, San Jose, CA (US); Chi-Fai Ho, Sunnyvale, CA (US)

(73) Assignee: Nokia Siemens Networks Oy, Espoo (FI)

( * ) Notice: Subject to any disclaimer, the term of this patent is extended or adjusted under 35 U.S.C. 154(b) by 1069 days.

(21) Appl. No.: 10/331,162

(22) Filed: Dec. 26, 2002

(65) Prior Publication Data

US 2004/0125746 A1   Jul. 1, 2004

(51) Int. Cl.
*H04L 1/10* (2006.01)
*H04L 12/26* (2006.01)
*H04J 3/14* (2006.01)
*H04J 1/16* (2006.01)
*G01R 31/08* (2006.01)
*G06F 11/00* (2006.01)

(52) U.S. Cl. .................. 370/235; 370/389; 370/217
(58) Field of Classification Search ................. 370/235, 370/225, 238, 352, 392, 248, 428, 401, 230, 370/229, 412, 389, 386, 338, 395; 709/222, 709/225, 238, 249, 220, 223, 203, 246; 455/567, 455/423, 512; 718/1
See application file for complete search history.

(56) References Cited

U.S. PATENT DOCUMENTS 6,101,616 A * 8/2000 Joubert et al. ................. 714/11

6,751,191 B1 * 6/2004 Kanekar et al. ............. 370/217
7,149,771 B1 * 12/2006 Gifford ....................... 709/203
2004/0109447 A1 * 6/2004 Douglass et al. ............ 370/389

FOREIGN PATENT DOCUMENTS

EP   1209876 A2   5/2002

OTHER PUBLICATIONS

Austin Godber, Partha Dasgupta, Secure Wireless Gateway, Sep. 2002, ACM Press, Proceedings of the 3rd ACM workshop on Wireless security WiSE '02, Department of Computer Science and Engineering @ Arizona State University.*
Damani, et al., "One-IP: techniques for hosting a service on a cluster of machines" Computer Networks and ISDN Systems, North Holland Publishing. Amsterdam, NL, vol. 29, No. 8-13, Sep. 1997, pp. 1019-1027.
Supplementary European Search under Article 157(2)(a) EPC Report dated Aug. 14, 2006, 3 pages.

* cited by examiner

*Primary Examiner*—Wing F. Chan
*Assistant Examiner*—Prenell P Jones
(74) *Attorney, Agent, or Firm*—Squire, Sanders & Dempsey L.L.P.

(57) ABSTRACT

A network gateway element is provided. The network gateway element appears as a single node to the external world, while it physically is maintained in at least two chassis. A routing node handles functions typically associated with routers, while another network element, such as a server, may handle functions typically associated with the server. The routing node may load-balance the traffic directed at the server. Additionally, the routing node may process packets for the server without the server having to become involved.

21 Claims, 5 Drawing Sheets

SYSTEM AND METHOD FOR IMPLEMENTING PROTOCOL STACK ACROSS MULTIPLE CHASSIS

FIELD OF THE INVENTION

The present invention relates to IP networks, and more particularly to IP gateways, routers, and servers.

BACKGROUND OF THE INVENTION

Generally, routers, servers, and host computers may be found within an IP network. An Internet host computer within an IP network may be defined as the end consumer of communication services. A host generally executes application programs on behalf of users employing network communication functions in support of this function. The host is coupled to routers and servers within the typical IP network.

A router implementation of an IP stack that is used within a network gateway can be defined in the following way. An Internet gateway is a network device that is connected to two or more networks that appears to each of the networks as a connected host. The Internet gateway has one or more physical interfaces and IP address(es) on each of the networks to which it is connected. When forwarding a packet, the gateway chooses the next-hop gateway or the final hop for the destination host. This choice, referred to as routing, depends upon a routing table within the gateway.

The currently defined RFCs follow the model in which the user layer forwarding plane and the applications reside in the same physical chasses. This makes it difficult when the entities are separated across different physical chasses.

What is needed is a way for the different physical chasses to be treated as a single network element.

SUMMARY OF THE INVENTION

The present invention is directed at addressing the above-mentioned shortcomings, disadvantages and problems, and will be understood by reading and studying the following specification.

According to one aspect of the invention, a network gateway element appears as a single node to the external world, while it may be physically maintained in at least two chassis.

According to another aspect of the invention, routing node within one chassis handles functions typically associated with routers, while another network element, such as a server, maintained within another chassis may handle functions typically associated with the server. The routing node may load-balance the traffic directed at the server. Additionally, the routing node may process some of the packets for the server without the server having to become involved.

According to another aspect of the invention, the apparatus, system, and method work with established communication principles of the Internet protocol.

DETAILED DESCRIPTION OF THE PREFERRED EMBODIMENT

Figure 1:
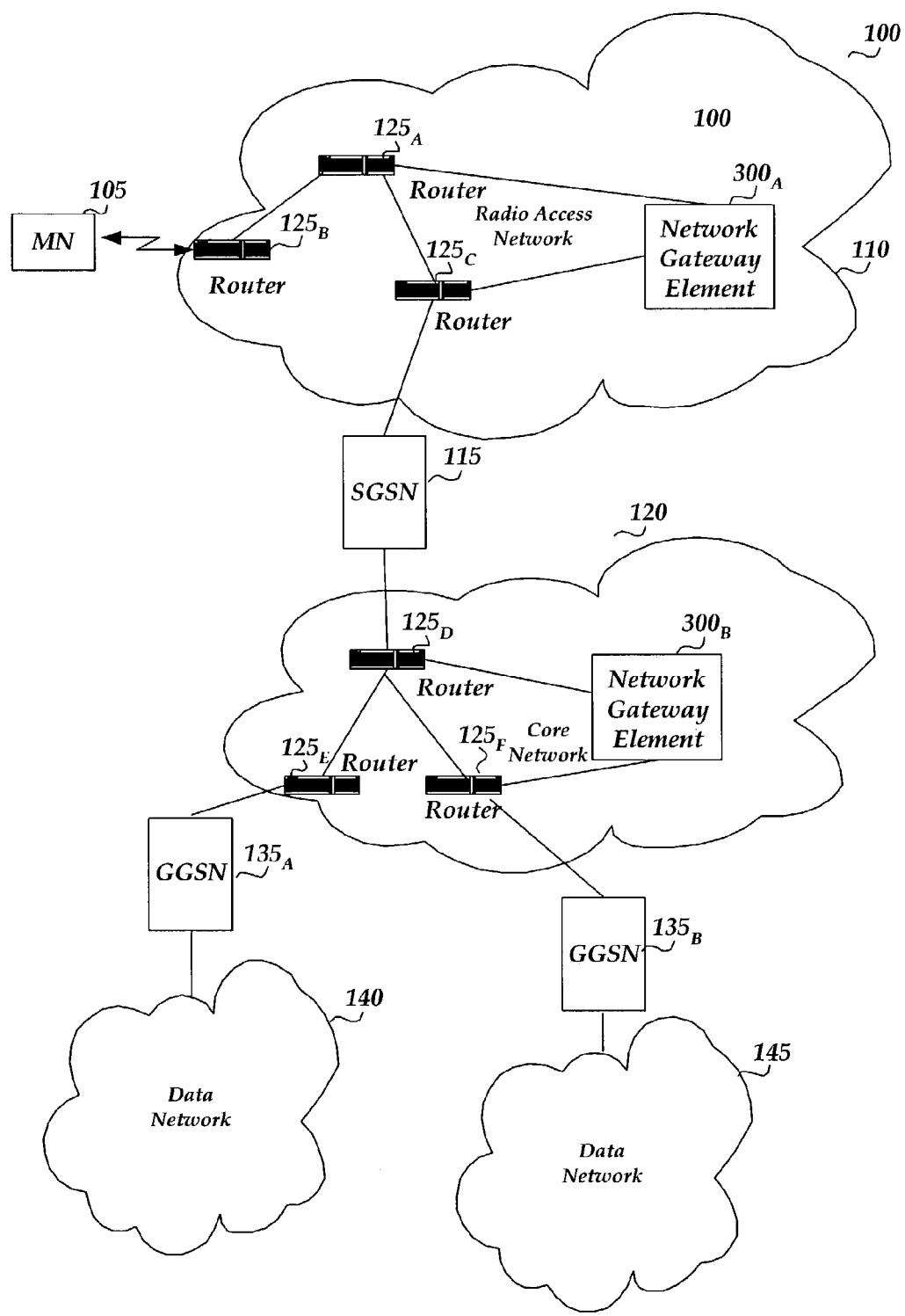
FIG. 1 illustrates an exemplary IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element, such as a router. The term "flow" means a flow of packets. The term "user" refers to any person or customer such as a business or organization that employs a node to communicate or access resources over a network. The term "operator" refers to any technician or organization that maintains or services an IP based network. The term "IP" refers to Internet Protocol. The term "ICMP" refers to Internet Control Message Protocol. The term "DNS" refers to Domain Name Service. The term "IPC" refers to Inter-Process Communication. Referring to the drawings, like numbers indicate like parts throughout the views. Additionally, a reference to the singular includes a reference to the plural unless otherwise stated or is inconsistent with the disclosure herein.

Briefly described, the present invention is directed at providing a multi-chassis network node that is represented as a single network node to the rest of the network.

Illustrative Operating Environment

With reference to FIG. 1, an exemplary network in which the invention may operate is illustrated. As shown in the figure, network 100 includes mobile node (MN) 105, radio access network (RAN) 110, SGSN 115, core network 120, routers $125_{A\text{-}F}$, network gateway elements $300_{A\text{-}B}$, GGSNs $135_{A\text{-}B}$, data network 140, and data network 145.

The connections and operation for IP network 100 will now be described. MN 105 is coupled to radio access network (RAN) 110. Generally, MN 105 may include any device capable of connecting to a wireless network such as radio access network 110. Such devices include cellular telephones, smart phones, handheld computers, personal computers, and the like.

Radio Access Network (RAN) 110 manages the radio resources and provides the user with a mechanism to access core network 120. Radio access network 110 transports information to and from devices capable of wireless communication, such as MN 105. Radio access network 110 may include both wireless and wired components. As shown in the figure, RAN 110 includes routers $125_{A\text{-}C}$. A network node, or nodes, may be used to provide Quality of Service (QoS) rules relating to how packets are processed.

Core network 120 is an IP packet based backbone network that includes routers, such as routers $125_{D\text{-}F}$, to connect the support nodes in the network. Routers are intermediary devices on a communications network that expedite message delivery. On a single network linking many computers through a mesh of possible connections, a router receives transmitted messages and forwards them to their correct destinations over available routes. A router may be a computer including memory, processors, and network interface units.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s 135$_{A-B}$ through core network 120.

GGSNs 135$_{A-B}$ are coupled to core network 120 through routers 125$_{A-C}$ and act as wireless-gateways to data networks, such as network 140 and network 145. Networks 140 and 145 may be the public Internet or a private data network. GGSNs 135$_{A-B}$ allow MN 105 to access network 140 and network 145.

A network gateway element (300$_A$) is coupled to the RAN and a network gateway element (300$_B$) is coupled to the core network. Network gateway elements may be coupled to any network. Briefly described, network gateway elements 300$_{A-B}$ are located within at least two physical chassis. According to one embodiment of the invention, network gateway elements 300$_{A-B}$ consists of a server within one chassis and a router located within another chassis. While the network gateway elements are shown as a single network node, in actuality, the network gateway elements are contained in at least two chassis. Network gateway elements 300$_{A-B}$ are shown as a single network node as that is how it is viewed by the rest of the network nodes, such as the routers illustrated.

Furthermore, computers, and other related electronic devices may be connected to network 140 and network 145. The public Internet itself may be formed from a vast number of such interconnected networks, computers, and routers. Network 100 may include many more components than those shown in FIG. 1. However, the components shown are sufficient to disclose an illustrative embodiment for practicing the present invention.

Figure 2:
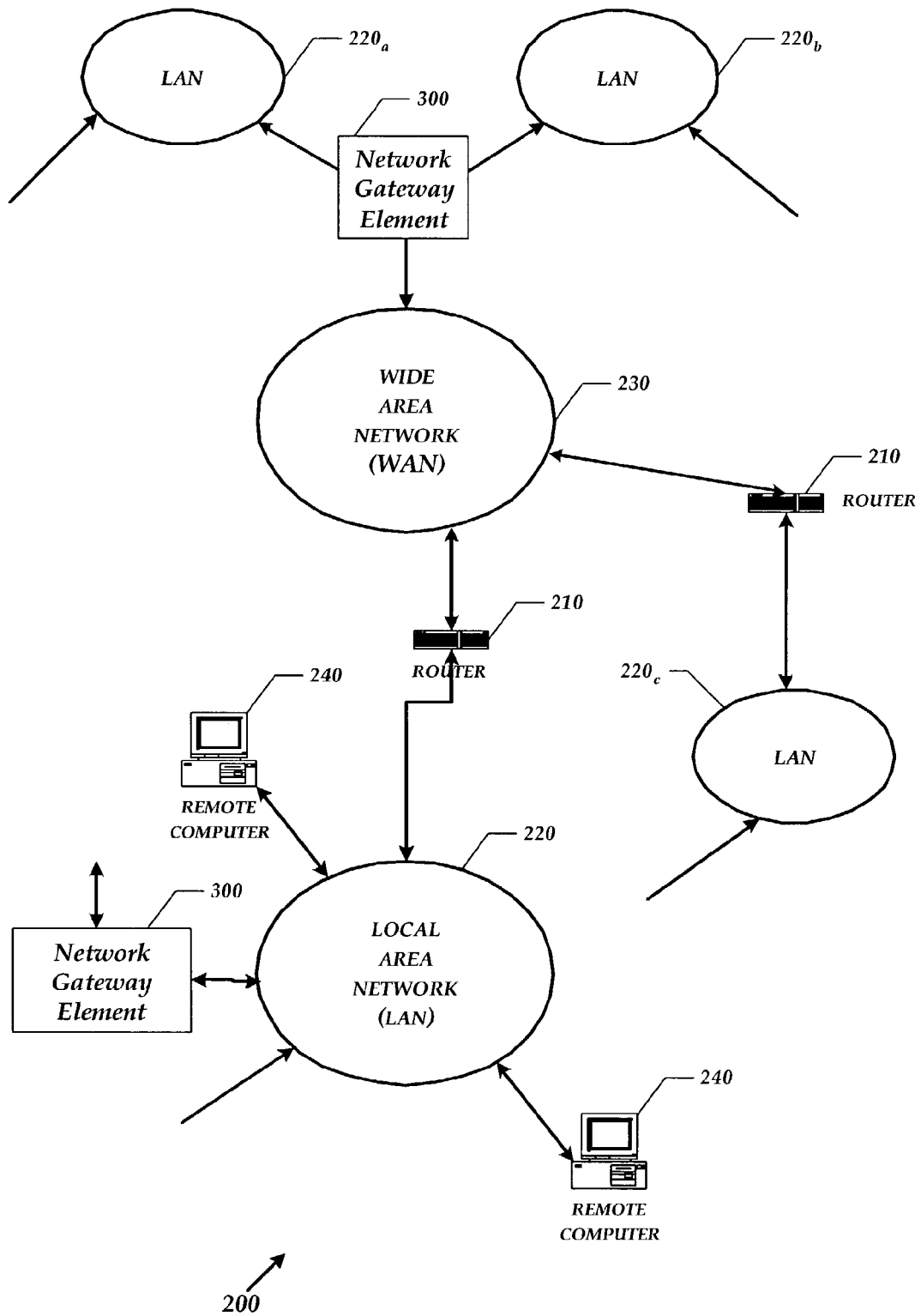
FIG. 2 shows a schematic diagram that illustrates an exemplary system overview in which local area networks and a wide area network are interconnected by routers and network gateway elements.

FIG. 2 shows another exemplary system in which the invention operates in which a number of local area networks ("LANs") 220$_{a-d}$ and wide area network ("WAN") 230 interconnected by routers 210 and network gateway elements (300). On an interconnected set of LANs—including those based on differing architectures and protocols—, a router acts as a link between LANs, enabling messages to be sent from one to another.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), Gigabit-ethernet links, Packet-Over-Sonet (PoS) links, wireless links, or other communications links. Furthermore, computers, such as remote computer 240, and other related electronic devices can be remotely connected to either LANs 220$_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Figure 3:
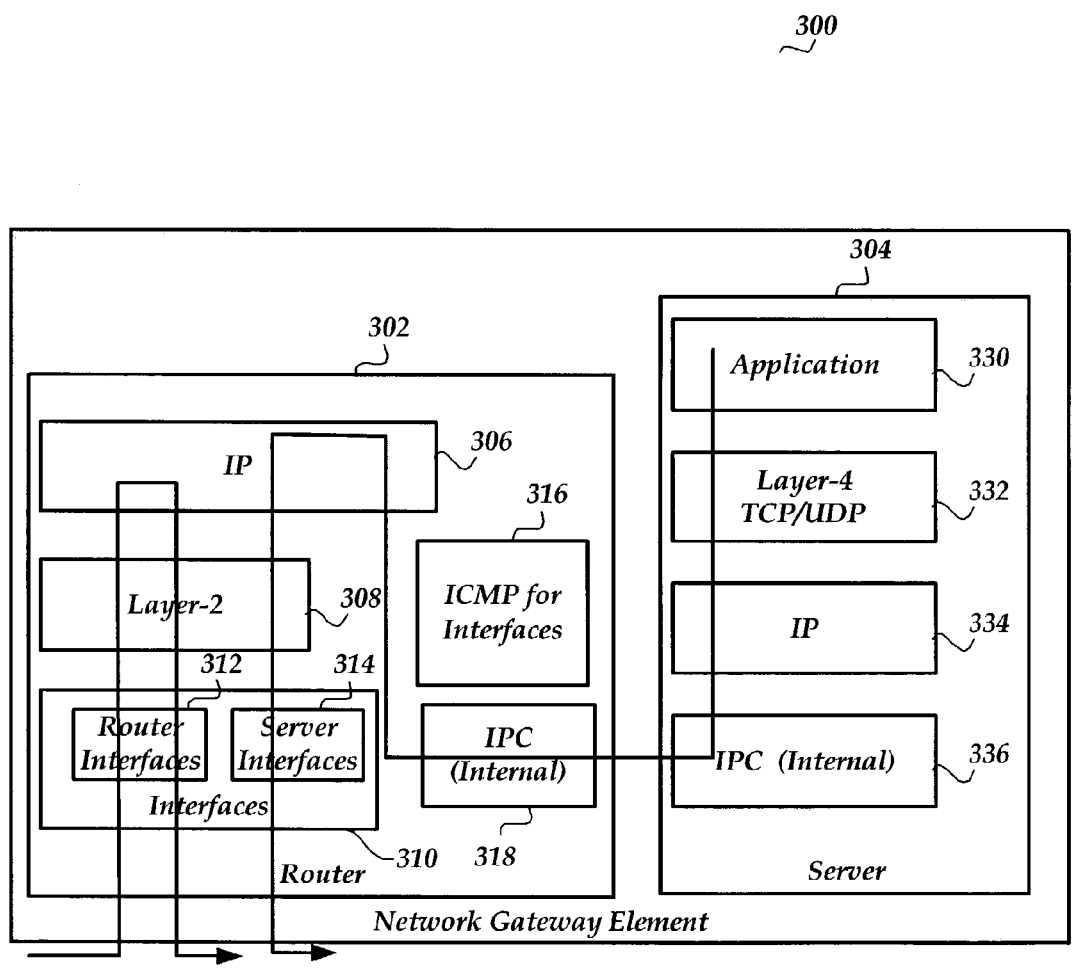
FIG. 3 illustrates an overview block diagram of a network gateway element.

FIG. 3 illustrates a network gateway element (300) in accordance with aspects of the invention. As shown in the figure, network gateway element 300 includes router 302 and server 304. Router 302 includes IP layer 306, layer-2 308, interfaces 310, (Internet Control Message Protocol) ICMP for interfaces 316 and (Inter-Process Communication) IPC 318. Interfaces 310 include router interfaces 312 and server interfaces 314. Server 304 includes application 330, layer-4 332, IP layer 334 and IPC 336.

Router 302 and server 304 are located within different physical chassis. The present architecture provides many advantages when the IP-interfaces and the IP-applications are not co-located within the same chassis. When the current network gateway element architecture is used, router 302 and server 304 appear as a single network node to a network. Router 302 and server 304 share the same IP Address thereby providing a single network-element image to the external world.

Network gateway element 300 acts as both a host and a gateway. It acts as a "host" since it is the ultimate consumer of the communication services and it executes application programs on behalf of users. It also acts as a "gateway" since it uses the routers capabilities for employing network and/or Internet communication services. Operation of network gateway element 300 will now be described in more detail.

Handling of a received packet by network gateway element 300 will be described first. When a packet arrives at network gateway element 300, router 302 inspects the received packet to determine the action to perform on the packet. The received packet is received at interface 310, and handled by layer-2 308 and IP layer 306. Some packets that are intended for server 304 may be handled by router 302 without server 304 ever receiving the packet. For example, ICMP packets may be processed on router 302 on behalf of server 304. Generally, router 302 will handle functions that it may perform more efficiently than server 304. Similarly, server 304 will handle functions that it may perform more efficiently than router 302. In this way, router 302 helps in preventing server 304 from incurring a heavy demand for packet-processing. When the received packet is destined for an application on server 304, such as application 330, the packet is sent to server 304 using IPC 318. To determine whether a packet is destined for server 304 the flows programmed in router 302 are checked.

For packets handled by server 304, IPC 336 receives the packet and forwards the packet to layer-4 332 through IP layer 334. Layer-4 processes the packet and delivers the packet to application 330. Application 330 may then use the packet.

Packet transmission from the server will now be described in more detail. Application 330 generates a packet. Layer-4 processes the packet. IP 332 then processes the packet, including preparing the IP header for the packet. The packet is then sent to IPC 318 on router 302 through the servers IPC (336). Router's IP 306, and layer-2 308, processes the packet and forwards the packet to interfaces 310. According to one embodiment of the invention, the generated packet is forwarded to server interface 314. The packet is then sent to a coupled network. The router and server interfaces may be located within the same "physical" interface.

An advantage of the network gateway element is that the IP interfaces, and IP addresses of the network gateway element are co-owned by the server and the router. Another advantage is that the traffic relating to the server may be load-balanced by the router using its own information and configuration (e.g. DNS) that is transparent to the server. Multiple network elements may be presented to the external world as a single node.

Figure 4:
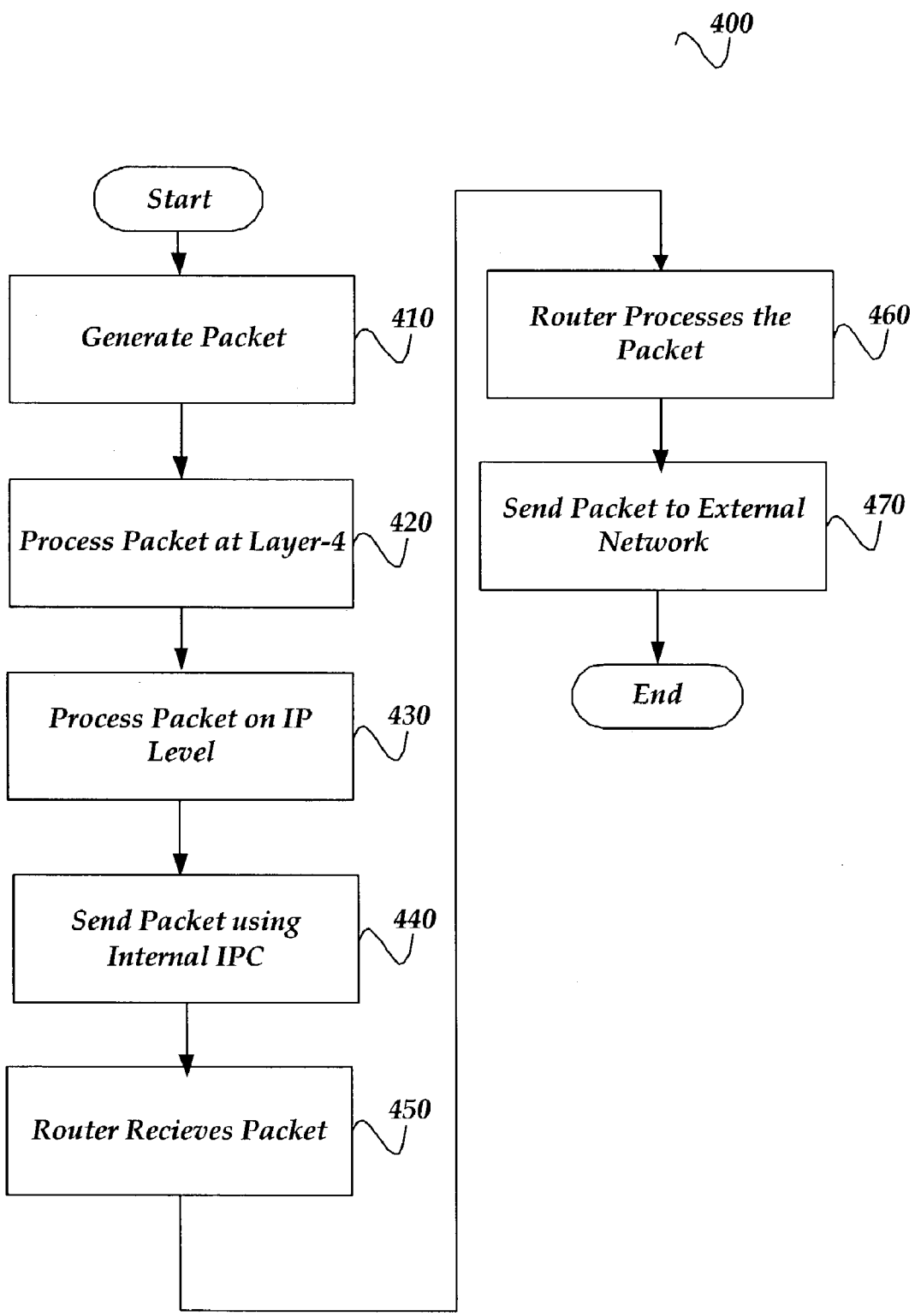
FIGS. 4 and 5 show a process for a network gateway element process; in accordance with aspects of the invention.

FIG. 4 illustrates a process for a server generating a packet to be sent out on a network, in accordance with aspects of the invention. After a start block, the process flows to block 410 where a packet is generated. Moving to block 420, the packet is processed by Layer-4. Transitioning to block 430, the packet is processed at the IP level. Flowing to block 440, the packet is sent to the routing element using the server's IPC. The router receives the packet (block 450), processes the packet (block 460) and sends the packet to the external network (block 470).

Figure 5:
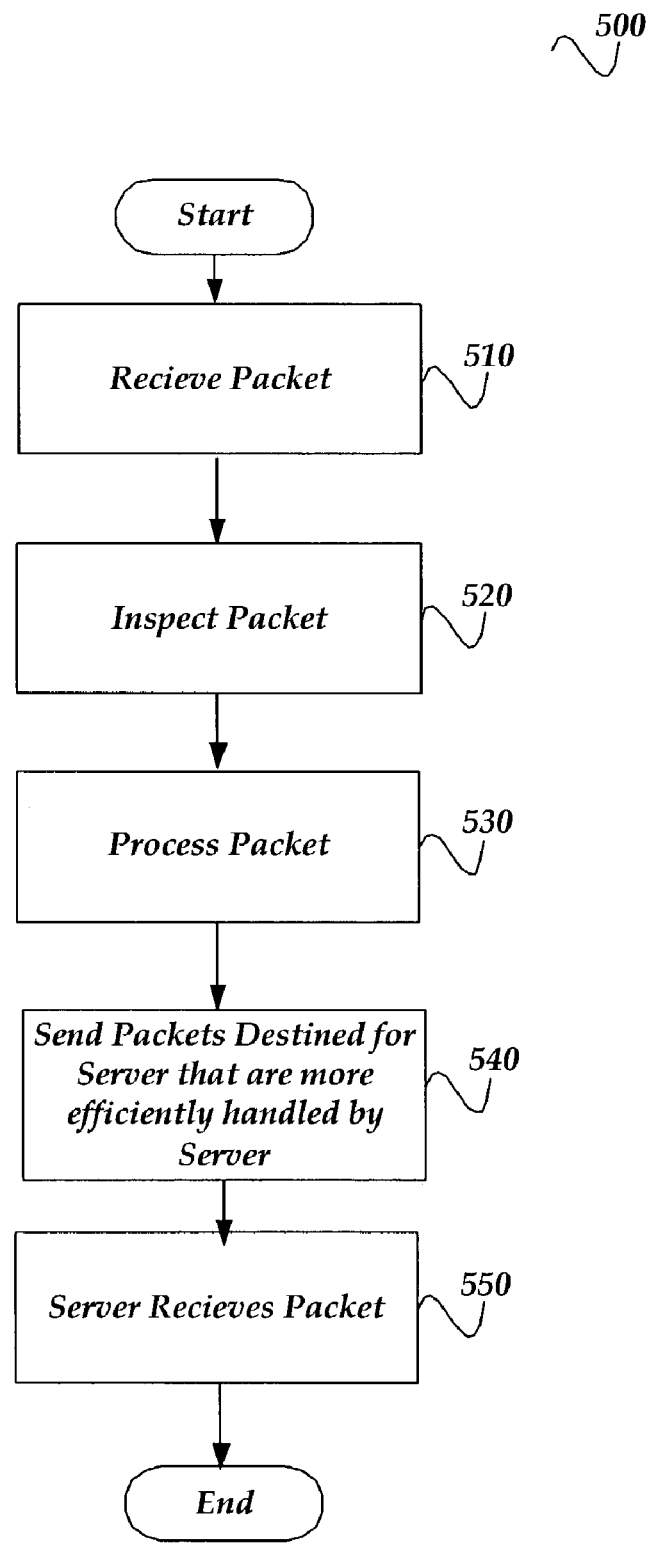

FIG. 5 illustrates a process for receiving a packet at a network gateway element, in accordance with aspects of the invention. After a start block, the process flows to block 510 where a packet is received. Moving to block 520, the packet is inspected. The inspection determines the actions to perform on the packet. Transitioning to block 530 the packet is processed based on the inspection. When the inspection determines that the packet may be more efficiently handled by the routing device, then the processing relating to the packet is performed by the routing device. Otherwise, the process flows to block 540 where the packet that is destined for the server, or layer-4 device, is sent to the server. Flowing to block 550, the server receives and processes the packet. The process then returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A network element that appears as a single node within communication network comprising:
   a routing node configured to perform actions, including:
   receiving a packet that is destined for a server address that is associated with a server node;
   determining when to process the packet based on an inspection of the packet and processing efficiency of the routing-node and the server-node; and
   processing the packet when so determined; otherwise sending the packet to the server node,
   wherein the server node is configured to receive the packet sent by the routing-node, and process the packet, and
   wherein the router address and the server address are the same.

2. The network element of claim 1, wherein the network element is configured to act as both a host and a gateway.

3. The network element of claim 1, wherein the communication network is an internet protocol network.

4. The network element of claim 1, wherein the server address and the router address are an internet protocol address.

5. The network element of claim 1, wherein the routing node is further configured to load-balance traffic directed at the server node.

6. The network element of claim 1, wherein the routing node is further configured to validate packets directed at the server.

7. The network element of claim 1, wherein the routing node and the server node are located within different physical chassis.

8. The network element of claim 1, wherein the routing node and the server node are located within the same physical chassis.

9. The network element of claim 1, wherein the server is further configured to deliver the packet to an application.

10. The network element of claim 9, wherein the action to perform on the packet includes processing the packet intended for the server node at the routing node.

11. The network element of claim 9, further comprising an inter-process communication layer configured to send the packet to the server node for processing.

12. The network element of claim 9, further comprising a Layer-4 that is configured to process the packet and deliver the packet to an application.

13. The network element of claim 9, wherein the server node is further configured to generate a packet, process the generated packet, preparing an internet protocol header for the generated packet, and send the generated packet to the router node for to forward the generated packet out an interface.

14. A method for receiving a packet from a network at a network element, comprising:
   receiving a packet that is destined for a server address;
   inspecting the packet;
   determining an action to perform on the packet; and
   handling the packet using a routing element having the same address as the server element when the action determined is more efficiently handled by the routing element than the server element, otherwise sending the packet to the server element for processing.

15. The method of claim 14, wherein the routing element address and the server address is an internet protocol address.

16. The method of claim 15, wherein the network element acts as both a host and a gateway.

17. The method of claim 14, wherein handling the packet further comprises load-balancing traffic directed at the server element.

18. The method of claim 14, further comprising receiving the packet at the server element and processing the packet by the server element.

19. The method of claim 16, wherein processing the packet further comprises sending the packet to an application.

20. A method for routing and processing a packet in a communication network having a network element that appears as a single node within the communication network, comprising:
   receiving a packet by a routing node, the packet is destined for a server address that is associated with a server node;
   determining by the routing node when to process the packet based on an inspection of the packet and processing efficiency of the routing-node and the server-node; and
   processing the packet by the routing node when so determined, otherwise sending the packet to the server node and processing the packet by the server node,
   wherein the router address and the server address are the same.

21. A router for receiving a packet from a network at a network element, comprising:
   a receiving unit configured to receive a packet that is destined for a server address;
   an inspection unit configured to inspect the packet;
   a determining unit configured to determine an action to perform on the packet; and
   a handling unit configured to handle the packet using a routing element having the same address as the server element when the action determined is more efficiently handled by the routing element than the server element, otherwise the router is configured to send the packet to the server element for processing.

\* \* \* \* \*